United States Patent [19]

Stewart

[11] Patent Number: 4,906,172
[45] Date of Patent: Mar. 6, 1990

[54] MOLD PRESS WITH DIELECTRIC ELECTRODES

[75] Inventor: David R. Stewart, Richmond, Tex.

[73] Assignee: Shell Oil Company, Houston, Tex.

[21] Appl. No.: 239,104

[22] Filed: Aug. 31, 1988

[51] Int. Cl.[4] ............................................. B29C 35/12
[52] U.S. Cl. ............................ 425/174.4; 425/174.8 E
[58] Field of Search .................. 425/78, 174.4, 174.8, 425/174.8 E, 174.6; 264/26; 156/379.6, 500

[56] References Cited

U.S. PATENT DOCUMENTS

| | | | |
|---|---|---|---|
| 2,280,771 | 4/1942 | Dufour et al. | 264/26 |
| 2,395,920 | 3/1946 | Grotenhuis | 425/174.6 |
| 2,407,833 | 9/1946 | Jablonsky | 264/26 |
| 2,423,915 | 7/1947 | Wacker | 264/26 |
| 2,434,573 | 1/1948 | Mann et al. | 264/26 |
| 2,437,127 | 3/1948 | Richardson | 264/26 |
| 3,232,810 | 2/1966 | Reesen | 156/380 |
| 4,238,267 | 12/1980 | Konstantin | 156/379.6 |
| 4,253,898 | 3/1981 | Rinker et al. | 156/272.2 |
| 4,420,670 | 12/1983 | Crowell et al. | 219/10.81 |
| 4,435,244 | 3/1984 | Back et al. | 156/379.8 |
| 4,441,876 | 10/1984 | Marc | 425/174.8 |
| 4,448,345 | 5/1984 | Helms | 229/43 |
| 4,451,721 | 5/1984 | Nemeskeri | 219/10.43 |
| 4,500,385 | 2/1985 | Waggoner | 156/379.6 |
| 4,512,942 | 4/1985 | Babbin et al. | 264/26 |
| 4,728,566 | 3/1988 | Lancaster et al. | 156/272.2 |

FOREIGN PATENT DOCUMENTS 699600 2/1941 Fed. Rep. of Germany ... 156/379.6

Primary Examiner—Willard Hoag

[57] ABSTRACT

A thermoplastic laminated billet is made by dielectrically heating a stack of thermoplastic layers within a mold press, wherein the sequence of dielectrically heatable and non-heatable individual layers is such that no more than a tie layer separates a heatable and non-heatable layer so that only that portion of the non-heatable layer nearest the heatable layer or layer melts. The laminated billet is formed within the mold press that has electrodes formed therein, the electrodes capable of impressing on the dielectrically heatable layers used to form the laminated billet sufficient energy to melt the heatable layers and at least a portion of the adjacent non-heatable layers.

1 Claim, 4 Drawing Sheets

MOLD PRESS WITH DIELECTRIC ELECTRODES

RELATED APPLICATION

This application is related to co-pending application entitled "Laminated Billets From Individual Billets", inventor Mr. David R. Stewart, filed 8-31-1988, Ser. No. 07/239,103.

BACKGROUND OF THE INVENTION

Laminated thermoplastic billets are used in thermoforming and solid-phase forming. These laminated billets are made by bringing molten layers of thermoplastic together under pressure where the molten layers are in the shape of the billet or where the layers are in the form of a sheet from which the laminated billet is subsequently cut.

Extrusion of thermoplastics into sheets and/or films (hereinafter sheet and film are collectively called sheet) is an old art. Simultaneous extrusion of multiple thermoplastics into sheets is also known. Such simultaneous extrusion is the general method by which laminated sheets are made. The molten individual sheets are brought together under pressure, usually between one or more rollers, and the sheets adhered to each other.

The layers in a laminate must adhere to each other. Some sets of thermoplastic are compatible with each other and can, by melting the contacting surfaces, be made to form a satisfactory laminate bond. Other sets of thermoplastics are not compatible and will not form a satisfactory laminate bond. These latter materials require an adhesive or tie layer between them. Such tie layers are generally known. For example, when polyolefins and polar polymers are to be laminated, one may use a graft copolymer of the polyolefin and maleic anhydride as the tie layer to tie the polyolefin to many polar thermoplastics. In essence, the polyolefin is laminated to one side of a sheet of the maleic anhydride/polyolefin graft copolymer and the polar thermoplastic is grafted to the other side of this tie layer. For example, a graft copolymer of polypropylene with about 0.1-20 percent maleic anhydride will serve as the tie layer between polypropylene and copolymers of ethylene and vinyl alcohol, polyvinyl chloride, nylon, polymethylmethacrylate, polyvinylacetate, and many other polar polymers. In general, tie layers are thinner than their adjacent layers.

If you are laminating two polyolefin layers, it is possible to use a graft or block copolymer of the two olefins as the tie layer or tie billet.

For example, a laminate having a layered sequence of polypropylene, a tie layer (a maleated polypropylene), an ethylene/vinylalcohol copolymer, a tie layer and polypropylene can be used to form containers having good oxygen and water barrier properties. The polypropylene gives the desired water barrier and the copolymer gives the oxygen barrier. In addition, the laminated billet may be thermoformed or solid-phase formed so as to obtain the required orientation of the polymer and thereby impart the required stiffness to the container.

The prior art method of forming the billets is by hot extrusion of multiple sheets of thermoplastic, lamination of the heated sheets as they exit the extruder while still in the molten state, and thereafter cutting the billets from the cooled laminated sheet. The portion of the sheet that is not used constitutes a laminated web of relatively little value. In most instances, this web is recycled into the laminate sheet and billet by grinding it into small pieces and extruding it as one of the layers or as part of another layer which forms a portion of the laminate.

The multi-thermoplastic regrind layer can be a waste of valuable polymer, and a waste of energy since a layer of blended polymer will not give the properties of the individual layers. Often these blends of thermoplastics are difficult to extrude and/or form.

When a regrind web of the laminate sheet is used as one of the layers in the laminate, it is an ineffective use of the three polymers and may require the use of additional tie layers. Furthermore, in the forming of the laminate and the container, this regrind layer or a layer containing a substantial amount of regrind is difficult to extrude and difficult to form, not leading to the optimum properties for the container. The thermal energy lost as the regrindable web cools also affects the process costs.

As an alternative to the normal oven heating of the sheets, some process utilize radio frequency or microwave heating processes. It is well known that some polymers can be made to dielectrically heat, or to dielectrically heat more readily, by incorporating dielectrically heatable materials into the polymer. Dielectrical heating is a forty year old art and generally information concerning the techniques used may be found in "Industrial Microwave Heating" by A. C. Metaxas and R. J. Meredith (Peter Peregrinus Ltd. Publisher) and "Plastic Fabrication by Ultraviolet, Infrared, Induction, Dielectric and Microwave Radiation Methods" by Arthur F. Readdy, Jr. (Published by Picatinny Arsenal, Dover, N.J. 07801, Department of Defense April 1972).

Materials like fillers, fibers, additives and plasticizers can be blended into the polymer to enhance its dielectrical heatability. Other polymers and copolymers having polar moieties distributed alone or in the chain (unless symmetrical) will dielectrically heat, e.g. ethylene/vinyl alcohol copolymers, polyvinylidene chloride, vinyl chloride, polyvinylidene fluoride, polyvinyl acetate, ethylene/CO copolymers, nylons, PET, cellulose, and polyurethanes for example.

Other polymers, particularly polyolefins and copolymers of olefins are essentially transparent to radio frequency ($0.1 \approx 300$ MHz) and microwave radiation ($\sim 300-10{,}000$ MHz), and will not dielectrically heat, e.g. polyethylene, polypropylene, polybutene-1, polypentene, and polystyrene.

Dielectric heating of thermoplastics is essentially based on the interaction of a polar moiety within the thermoplastic with an applied alternating field. This moiety may be a pendent polar group including but not limited to —OH, F, Cl, and

in polyvinyl alcohol, polyvinyl fluoride, polyvinyl chloride, polyvinylidene fluoride, nitrile, or a polar moiety incorporated into the polymer chain such as in polyesters

and nylons. On the other hand, the responding polar moiety may be an additive to the thermoplastic, including but not limited to solids like talc, glass, carbon black, $CaCO_3$, or impact modifiers such as ABS, chlorinated PE, nitrile rubber, acrylonitrile, etc., or soluble or compatible chemicals like plasticizers (epoxy resin, dioctylphalate, glycerol, diotylsebacate), and di-2-ethxylphalate.

Simplistically, dielectric heating can be pictured as frictional heating created by the movement of these polar moieties through a viscous medium, i.e. the surrounding polymer mass. Most polar moieties will respond to a frequency range within the radio frequency (RF) and/or microwave (MW) bands. The response is usually over a range of frequency and the maximum response will vary with temperature and with the viscosity of the polymer. In general, many thermoplastics respond better at higher temperatures for a given frequency. The range of heat absorption (P) by a thermoplastic is described as follows:

$$P = 2\pi f e_o e' \tan S\, e^2$$

where f is the frequency, $e_o$ is the permittivity of free space, $e'$ tan S is the loss-factor of the thermoplastic and E is the electrical field strength. When the electrodes are placed in contact with the thermoplastic, $e_o$ is not a factor. The loss-factor is a characteristic of the thermoplastic (or the material added to the thermoplastic). The frequency, f, is chosen on the basis of the loss-factor over the temperature range of interest. The electrical field is limited by the dielectric breakdown voltage, i.e., the voltage at which the system will arc.

An apparatus need be developed that minimizes waste in both the material that is used and the energy that is required to form the laminated billets. Such a process should not require the heating before lamination of the entire area of all of the sheets, including the area of the sheets that will not be used to form the laminated billets.

SUMMARY OF THE INVENTION

The apparatus of the present invention comprises a mold press having radio frequency electrodes connectable to a radio frequency generator so as to set up an alternating field running parallel to the sides of the billets, where except for the electrodes, the body and the plunger are made of a non-lossy material.

The mold press receives layers of dielectrically heatable and non-dielectrically heatable material pre-positioned in the desired order of lamination. The electrodes, when energized, heat the dielectrically heatable layers sufficiently to melt them and at least a portion of the adjacent non-dielectric layer(s), so as to form a laminated billet.

All of the layers therefore do not need to be heated prior to lamination, which reduces the power required for the process. Additionally, only the portion of the heatable webs that form the laminated billets need to be heated, i.e. the entire web does not require application of thermal energy prior to the lamination process.

These and other features, objects, and advantages of the present invention will become apparent from the following detailed description, wherein reference is made to the Figures in the accompanying drawings.

BRIEF DESCRIPTION OF THE DRAWINGS

FIG. 5a is a three dimensional view of the laminated billet made from the mold of FIG. 2a.

DETAILED DESCRIPTION OF THE INVENTION

Figure 1:
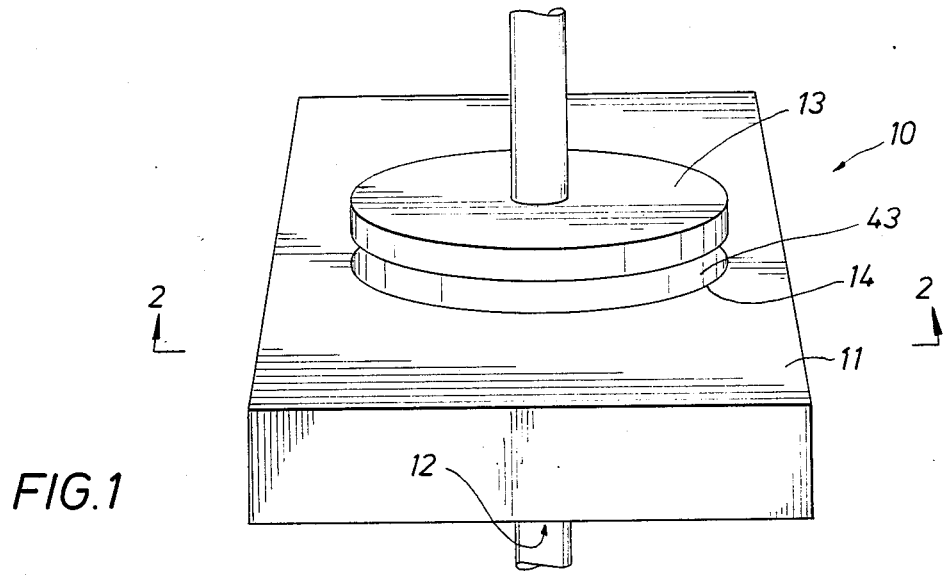
FIG. 1 is a three dimensional view of a mold press where the top and bottom are radio frequency electrodes.

The billets of this invention have a top flat side, a bottom flat side and a polyhedral or curvilinear edge. The word layer is used herein to mean an individual billet in a stack of billets of a thermoplastic type in the laminated billet.

The laminated billets of this invention are those that have at least one non-dielectrical heatable layer and at least one dielectrically heatable layer. The preferred sequence of layers in the stack of billets and the laminated billet is one that has at least one outside layer as a non-dielectrically heatable layer. An even more preferred sequence of layers is one where both outside layers are non-dielectrically heatable layers. The most preferred sequence of layers is one where there is no more than a tie layer separating a non-dielectrically heatable layer from a dielectrically heatable layer.

The non-dielectrically heatable layer or individual billet is one which does not heat appreciably at the frequency at which the stack of billets is being irradiated. Thus, a thermoplastic which will heat in the microwave (MW) region (e.g. 2000 $MH_z$) but will not heat in the radio frequency (RF) region (e.g. 30 $MH_z$) would be a dielectrically heatable layer in the MW region but not a dielectrically heatable layer in the RF region. The preferred dielectrically non-heatable layers are made of polyolefins which are essentially dielectrically non-heatable over the entire range of 0.1–10000 $MH_z$. Such polyolefins include but are not limited to polypropylene, polyethylene, polybutylene, polystyrene, styrenics, polymethacrylate, polypentene, and polycarbonate resins. Polypropylene includes homopolymer random copolymer (7–2% other olefin) and impact copolymers.

Polyethylene includes high and low density homopolymer and olefin copolymers. Polybutylene includes homopolymer and copolymer and/or terpolymer having 2–20% ethylene and/or propylene.

The dielectrically heatable layer includes, but is not limited to, polymers and copolymers having non-symmetrical pendent polar moieties, polar moieties incorporated into the polymer chains an polar or magnetic additives blended therein. Examples of preferred heatable polymers and copolymers having polar moieties include, but are not limited to, ethylene/vinyl alcohol copolymers, polyvinylidene chloride and its copolymers, polyvinylacetate and its copolymers, and other acrylics, polyurethanes, polyamides (nylons), ABS resins, polyacrylonitirles, ethylene/CO copolymers and ethylene/CO/propylene terpolymers.

Additives which may be incorporated into any layer to enhance its dielectric heatability or to convert a dielectrically non-heatable material to a dielectrically heatable material include but are not limited to alcohols, amines, urethanes, and vinyl halogens.

The use of additives makes it possible to use the invention to make billets of two essentially RF and/or MW transparent thermoplastics by filling one of the layers.

For example, a polypropylene may be laminated to another polypropylene or to a polyethylene (via a tie layer) by extruder blending a dielectrically heatable additive into the second polypropylene sheet or the polyethylene sheet or the tie layer. A sheet of homopolymer polypropylene and a sheet of copolymer polypropylene having 1–25 percent of nylon, EVOH, Saran, PVC, or Nucrel blended therein could be extruded, individual billets cut from the sheet, the webs ground and returned to the individual sheet extrusion process, the homopolymer and copolymer billets stacked so that at least every homopolymer billet is in contact with a copolymer billet and the stack of billets irradiated at 100 $MH_z$ under 1–100 psi pressure until the copolymer melts and by conduction melts the surface of the homopolymer and thereby forms the laminated billet.

When the above-described process is carried out using a sheet of polypropylene and a sheet of polyethylene having 1–20% of nylon, EVOH, Saran, PVC, or Nucrel blended therein, it is necessary to include a tie layer billet followed by a polyethylene billet so that upon irradiation at 100 $MH_z$ the polyethylene melts, which due to heat transfer to the adjacent tie layer melts the tie layer, which melts the surface of the polypropylene thereby laminating the stack of billets.

In an embodiment of the invention the tie layer is used as the dielectrically heatable layer. Since the tie layer is usually thinner than the other layers in the laminate and since it is in direct contact with the layers to be laminated, this embodiment uses the least energy. For example, where the stack of billets contains the sequence, 20 mil polypropylene, 2 mil ethylene/propylene block copolymer, 20 mil polyethylene, 2 mol ethylene/butene block copolymer, 20 mil polyethylene, 2 mil ethylene/propylene block copolymer, 20 mil polypropylene and each of the block copolymer billets is filled with 0.1–20% maleic acid or maleic anhydride, the stack may be irradiated at 100 $MH_z$ to complete the lamination. Only the 2 mil block copolymer and the inner surface of the other billets need be melted.

In another preferred embodiment, a stack of individual billets comprises a non-heatable polypropylene layer, a first tie layer heatable at a first frequency between 1 to 3000 $MH_z$ having 1–20% of PET blended therein, another non-heatable polypropylene, a second tie layer heatable at a second frequency different than said first frequency from 1 to 3000 $MH_z$ having 1–20% of Carilon, Saran, or Nylon blended therein and a final non-heatable layer of polypropylene. The laminating step of the invention can be carried out by irradiating within the first frequency range, and then within the second frequency range or simultaneously within both frequency ranges. Therefore, a layer which may be considered to be a dielectrically heatable layer at a first frequency or a first temperature may be a dielectrically non-heatable layer at a second frequency or a second temperature.

A dielectrically heatable layer is one whose loss-factor, at the frequency and field strength chosen, is high enough to absorb enough energy, i.e., raise the temperature, to melt the heatable layer, the tie layer, if present, and the surface of the dielectrically non-heatable layer closest to the heatable layer. A dielectrically heatable layer is one whose loss index at the frequency or frequencies being used is greater than about 0.075, more preferably greater than about 0.08, more preferably greater than about 0.09, and most preferably greater than about 0.1.

A dielectrically non-heatable layer is one whose loss-factor at the frequency or frequencies and field strength used, is not high enough to absorb enough energy, i.e. raise the temperature, to melt the non-heatable layer. A dielectrically non-heatable layer is one whose loss index at the frequency being used is less than about 0.07, more preferably less than about 0.06 and most preferably less than about 0.05.

The frequency or frequencies chosen are those within the range from about 0.1 to 1000 $MH_z$, more preferably 0.1 to 300 $MH_z$ and most preferably 0.1 to 200 $MH_z$. The lower frequencies are preferred because of their better penetration properties and therefore their tendency to give more even heating.

The field strength is limited by the breakdown strength of the system, i.e. the strength at which an arc will occur. The field strength chosen will be governed by the minimum needed to obtain the temperatures needed, the cost of the equipment and the desired cycle times. It is preferred, when the cycle time is to be minimized that the field strength be as close to the dielectrical breakdown as practical, preferably 85%, more preferably 90% and most preferably 95%.

Referring now to FIG. 1 a mold press 10 suitable for forming the laminated billet from the stack of individual billets is shown. The body 11 of the mold having a hole or cavity 43 defined therethrough is made of non-lossy, non-conducting material such as Teflon and the bottom 12 and top 13 are the electrodes for the dielectric heating. The bottom 12 can be fixed to arc past the mold body 11.

Figure 2A:
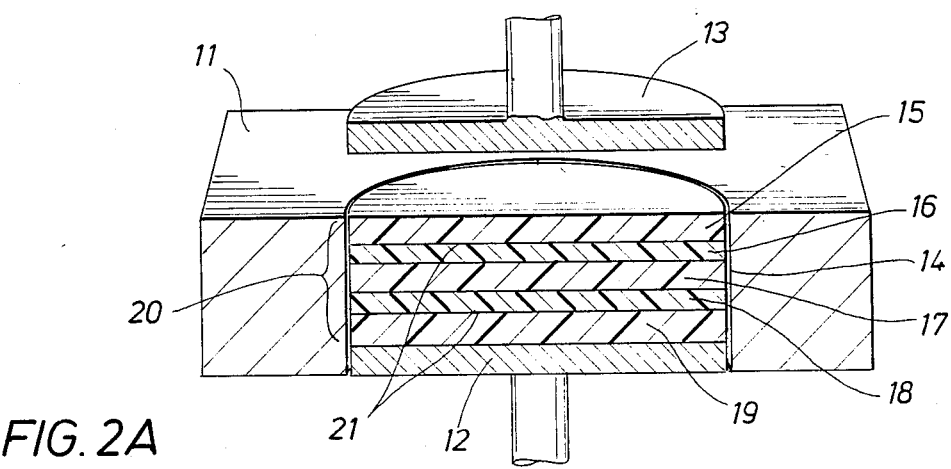
FIG. 2a is a partial view in cross-section of FIG. 1 taken along line 2—2 where the edge of the cavity is straight.

FIG. 2a is a cross-section of the mold press of FIG. 1 where the edge 14 of cavity 43 is straight and where the stack of individual billets 20 shown therein are essentially flush with the edge 14 of the body 11. In FIG. 2a the top layer 15 is a dielectric non-heatable layer, the next layer 16 is a tie layer, the next layer 17 is a dielectrically heatable layer, the next layer 18 is a tie layer and the bottom layer 19 is a dielectrically non-heatable layer. Pressure is applied to the stack of individual billets either directly by moving the bottom 12 or, but more preferably, the top 13 electrode directly onto the stack 20 of billets or by inserting a non-conducting non-laminating stop, for example made of teflon, between the moving electrode and the stack and the field applied to the stack. The heatable layer 17 heats, heats the tie layers 16 and 18 (when present) and heats the inside surface 21 of the non-heatable layers 15 and 19. The heatable layer 17, the tie layers 16 and 18 and the inside surface 21 melt and the stack 20 is fused into a laminated billet.

The laminating process does not require a lot of pressure. The pressure needed to effect lamination can be as low as about 1 psi, more preferably between about 1 and about 100 psi and most preferably between about 1 and about 25 psi.

One of the advantages of forming the billet with non-heatable layers as the bottom and top of the laminated billet is that the laminated billet can be immediately removed from the mold because the top side and bottom side of the billet are not molten, i.e. are below their softening point and give dimensional stability to the billet. It is preferred that the molten edges of two billets not be brought into contact.

Figure 2B:
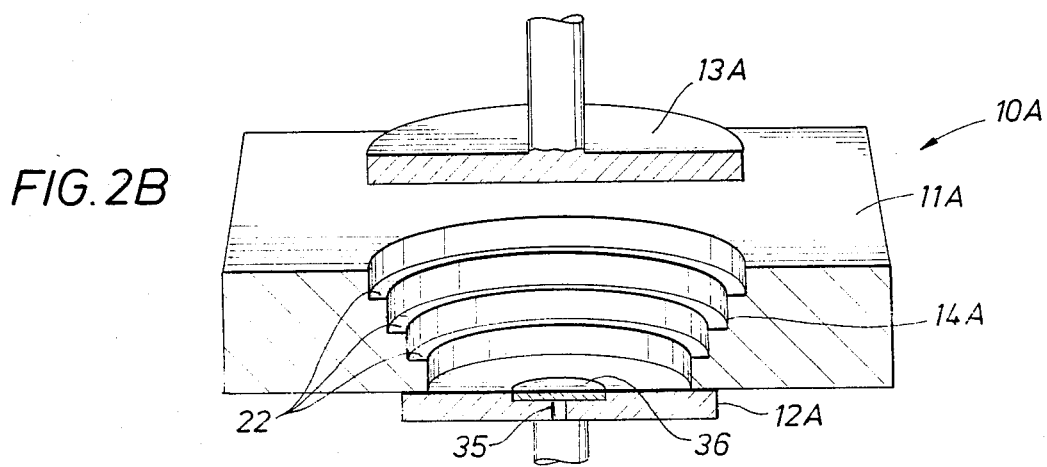
FIG. 2b is a partial view in cross-section of FIG. 1 taken along line 2—2 where the edge of the cavity is stair-stepped.

FIG. 2b illustrates a preferred embodiment of the mold press used in the invention where at least one of the layers of the laminated billet will have a different shape or size than another layer of the billet. The mold 10A is composed of the top 13A and bottom 12A which form the electrodes and the body 11A. The edge 14A is formed so as to take a stack of billets 20 where each successive billet in the sequence of individual billets is larger tha the individual billet on which it rests. This embodiment may be used to make cylindrical billets where each individual billet, beginning at the top, has a diameter equal to or larger than the billet on which it rests. The edge 14A has a plurality of steps or sections 22 to match the diamer of the individual billet in stack 20. The height of the individual billet should be equal to or slightly larger than the height of the steps 22.

Laminated billets having at least one outside layer larger than the other layers allow one to mold cups and lids with unique lips.

FIG. 2b also shows a knockout means 35 such as plunger 36 for removing the laminated billet from the mold 10A. The plunger 36 is activated either mechanically or pneumatically once the laminated billet is formed and pushes the laminated billet out of the mold 10A.

Figure 3:
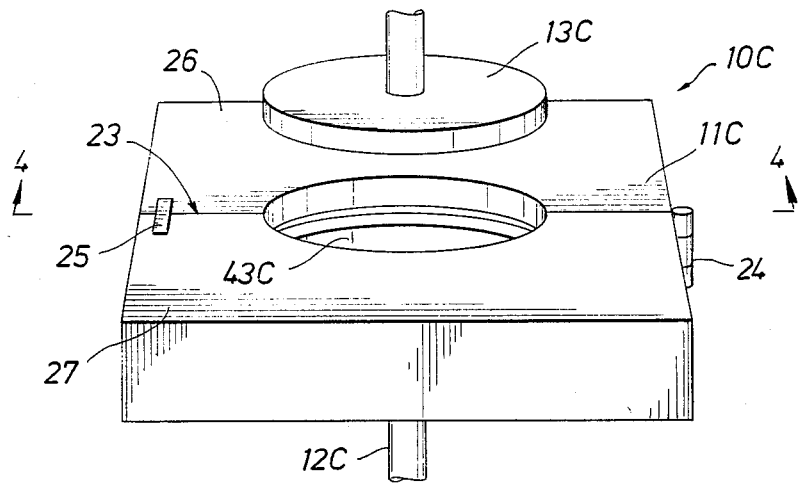
FIG. 3 is a three dimension view of a hinged mold press where the inside of the cavity is larger than the outside.
Figure 4:
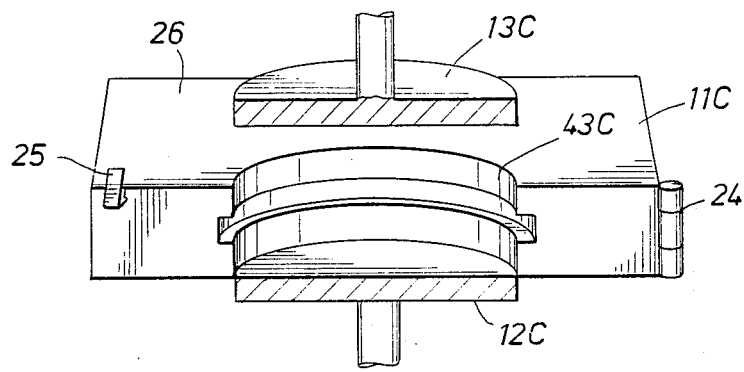
FIG. 4 is a top view of a partial cross-section of FIG. 3 taken along line 4—4.

It is also possible to have to make billets where an inner layer has a larger cross-section than either outside layer. The mold press would have to be a split mold to allow the mold to be filled with the individual billets and to remove the laminated billet. FIGS. 3 and 4 illustrate a split mold press 10C where the top 13C and bottom 12C are electrodes, with a split opening 23 through the body 11C and the cavity 43C having a hinge 24 on the outside edge of the body 11C to open the split body 11C and a lock means 25 to hold the two halves 26 and 27 together while laminating the individual billets.

Figure 5A:
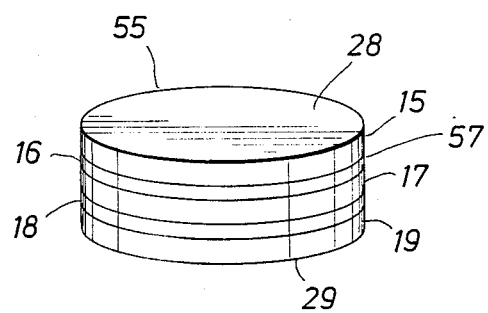
Figure 5B:
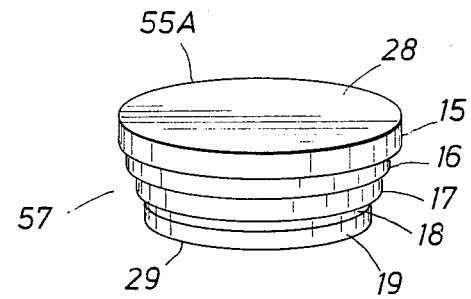
FIG. 5b is a three dimensional view of the laminated billet made from the mold of FIG. 2b.
Figure 5C:
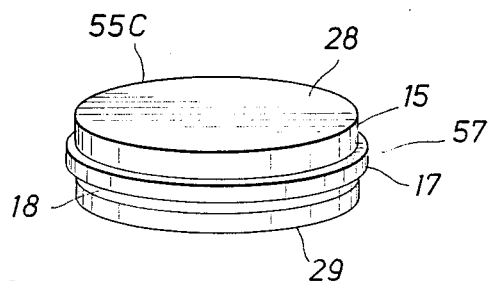
FIG. 5c is a three dimensional view of the laminated billet made from the mold of FIG. 3.

FIGS. 5a, 5b and 5c show the laminated billets 55, 55A, and 55C which would be formed from the molds 10, 10A, and 10C respectively of FIGS. 2a, 2b and 4. In general, billets 55, 55A, and 55C have a flat top side 28 and a flat bottom 29 and a polyhedral and/or curvilinear billet edge 57.

In FIGS. 5a and 5b, the layers 15 and 19 are dielectrically non-heating layers, the layers 16 and 18 are tie layers and the layer 17 is a dielectrically heatable layer. Note that in the example shown in FIG. 5b, layers 18 and 19 are the same diameter and shape.

When two or more non-heatable layers or two or more heatable layers or two or more tie layers are in a stack or laminated billet they may be made of the same composition or a different composition.

In FIG. 5c, no tie layer is shown between layers 15 and 17 (for example, dielectrically heatable layer 17 could be made of an impact polypropylene filled with a lossy material such as PET or Nylon while dielectric non-heatable layer 15 could be a compatible polypropylene layer), whereas a tie layer 18 is shown between layers 17 and 19 (for example, a block copolymer of ethylene and propylene to tie the heatable polypropylene and a non-heatable polyethylene layer).

Figure 6:
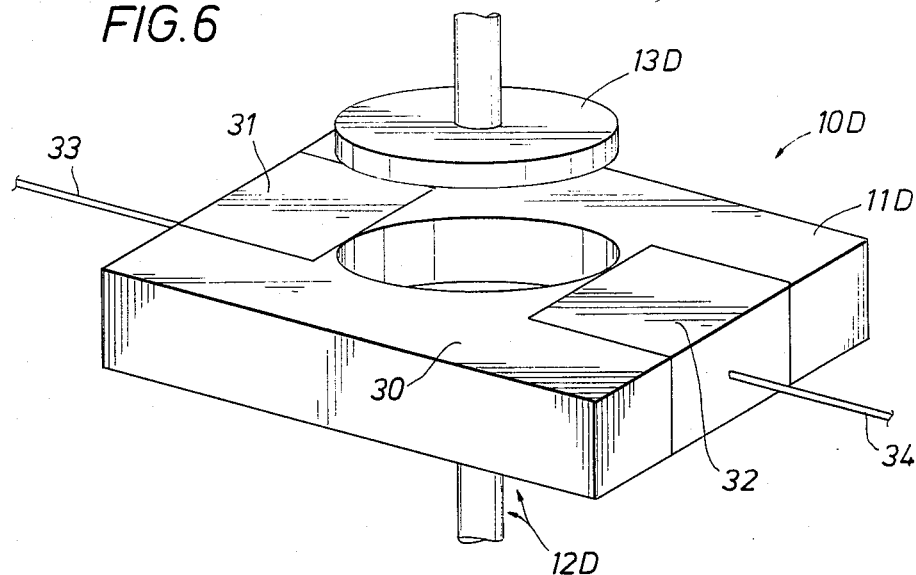
FIG. 6 is a three dimensional view of a mold press where the electrodes are part of the body of the mold and cover the entire cavity.

FIG. 6 illustrates a preferred mold 10D configuration wherein the electrodes are part of the body 11D, not part of top 13D and bottom 12D. In FIG. 6, the top 13D, bottom 12D and that part 30 of the body 11D are made of non-lossy materials (Teflon for example) while the electrodes 31 and 32 are made of metal. The bottom 12D can be part of the body 30. Lines 33 and 34 lead to a radio frequency generator (not shown). As in the previously described mold presses, the movable top 13D is on a plunger (not shown) operated by pressure. Making the electrodes part of the body 11D can lead to a more concentrated field.

Figure 7:
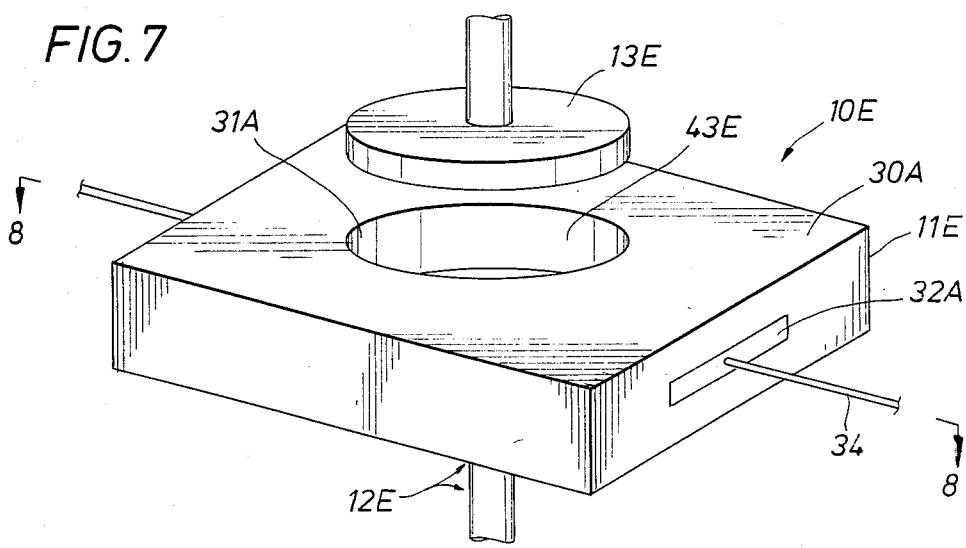
FIG. 7 is a three dimensional view of a mold press where the electrodes are part of the body of the mold and cover only a portion of the mold.
Figure 8:
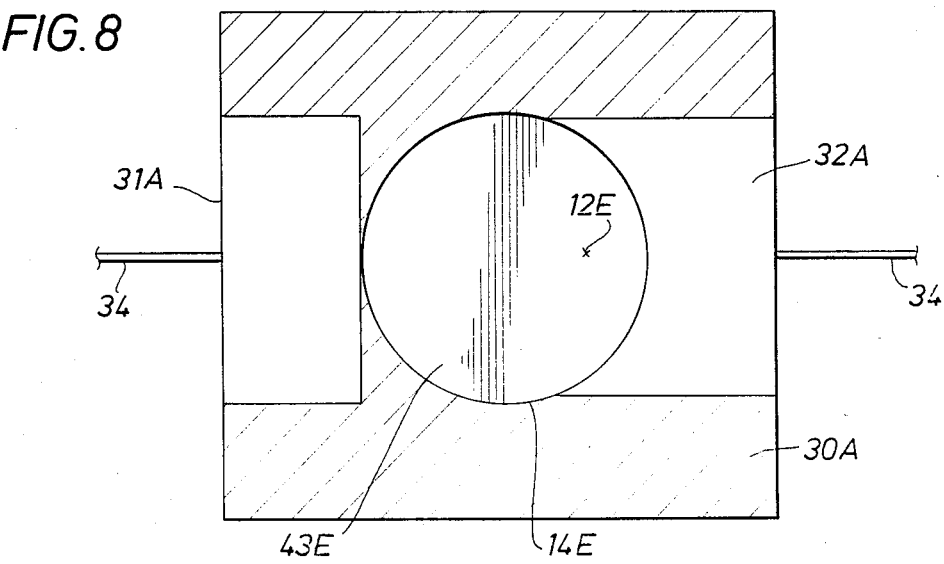
FIG. 8 is a partial view in cross-section of the mold of FIG. 7 taken along line 7—7.

FIGS. 7 and 8 shown a specialized embodiment of a mold 10E having electrode 31A and 32A as part of body 11E, but the electrodes 31A and 32A are essentially the thickness of the dielectrically heatable layer and are located in the non-lossy portion 30 of the body 11E at the position along the edge 14E where the heatable layer or layers will be located. This arrangement of the electrodes 31A and 32A will concentrate the field within the heatable layer. If the sequence of individual billets selected to make up the laminated billet were such that there were more than one dielectrically heatable layer separated by dielectrically non-heatable layers, then more than one set of electrodes 31A and 32A could be positioned in the non-lossy body 11E to correspond to the positions of the heatable layer in the mold cavity 43E. The top 13E and bottom 12E of that part of the body 11E are again made of non-lossy material.

All of the molds have been depicted as single cavity molds, but it is contemplated that such molds may be multi-cavity molds.

Figure 9:
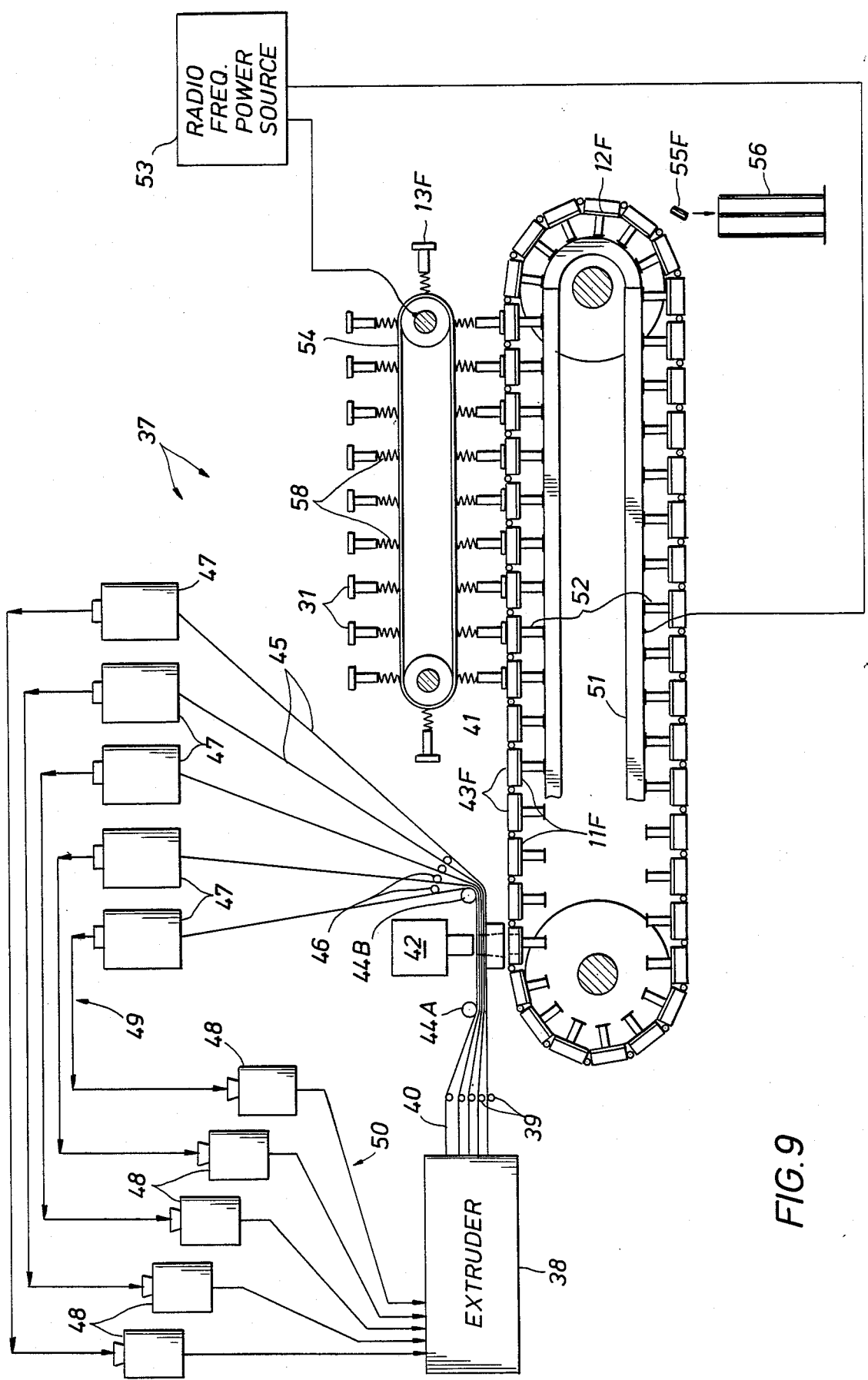
FIG. 9 is a view of an apparatus for continuously making laminated billets and regrinding the individual webs.

FIG. 9 illustrates a preferred embodiment of the invention where the process of forming a laminated billet is continuous. The continuous line 37 comprises an extruder 38 capable of extruding more than one sheet of film, chill rollers 39 to cool the sheets 40 below their softening point, a mold conveyor belt 41 on which a plurality of mold bodies 11F are attached, a stamping means 42 such as a movable die well known to the art for stamping or cutting a stack of billets from the stacked sheet, said stamping means indexed with the movement of the belt 41 so that the stack of billets are cut and fall into the cavity 43F defined within the body 11F. Optionally, two sheet guide means 44A, 44B (shown as rollers) direct the plurality of sheet adjacent the mold belt 41. The webs 45, i.e. the sheet once the billet has been cut and removed, are separated from each other by a web separation means 46, shown as a series of rollers, and each different web is thereafter ground or chopped into small pieces by a grinder means 47 such as a grinder well known to the art. The ground thermoplastic is returned to their respective individual extruder supply hoppers 48 from which the extruder 38 receives a mixture of new and regrind thermoplastic for each of its different sheets 40. Grinder/hopper transport means 49 and hopper/extruder transport means 50 move resin particles from the grinder means 47 to the hoppers 48 and from the hoppers 48 to the extruder 38. These may be conveyor belts, pneumatic and/or gravity tubes known in the art for moving resin particles.

Below each body 11F, forming the bottom of the cavity 43F, is a bottom side electrode 12F contacted to a bottom electrode rail means 51 to allow the bottom electrode 12F to travel with the body 11F on the mold belt 41, the electrode 12F being connected to the bottom rail means 51 by a rail/bottom electrode connection means 52, shown as a wire or cable, and the rail 51 being connected to a radio frequency power source 53. The line 37 also includes a top electrode conveyor belt 54 having top side electrodes 13F attached thereto, the movement of the electrode belt 54 and the mold belt 41 being positioned and indexed such that the top electrode 13F is positioned over the cavity 43F as the two belts 41 and 54 move. The top electrode 13F has a plunger means 58, such as a spring to exert pressure on the stack of billets. The belt 54, rail 52 and the RF or MW source 53 are indexed so that a RF or MW field is supplied when the top electrode 13F is positioned on the stack 20 (not shown) and remains on until the top electrode 13F disengages from the laminated billet 55. (This section of the apparatus would be shielded to protect people). The laminated billet 55F falls or is ejected out of the cavity 43F into a billet rack means 56 for stacking the laminated billets 55F top 28 to bottom 29 (FIG. 5 et. al.) to prevent sticking together.

A continuous laminated billet process comprises extruding a plurality of sheets, cooling the sheets below their softening points, stacking the sheets so that a dielectrically heatable sheet is separated from a dielectrically non-heatable sheet by no more than a tie sheet, cutting a stack of individual billets from said stack of sheets, separating the web from the stack of individual billets, separating the different webs, grinding the webs individually and blending the regrind with fresh resin of the same kind and supplying this blend to the extruder to make the individual sheet, placing the stack of billets in a RF heated mold press, heating the stack of billets so that the heatable individual billet or billets melt, melts any tie billet present in the stack and only the surface of the non-heatable billet closest to the heatable billet, applying pressure so as to cause the individual billets to adhere, i.e. the melted surfaces to adhere, to each other thereby forming a laminated billet.

Many other variations and modifications may be made in the apparatus and techniques hereinbefore described by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. A mold press for forming a laminated thermoplastic billet from a stack of individual billets, one of said individual billets being dielectrically heatable, said mold press comprising: a mold body having a cavity defined downwardly therein, said mold body operatively engaged to a continuous movable mold conveyor belt, a portion of said belt being positioned beneath stamping means, said cavity having a bottom side electrode located at the bottom of said cavity and sides shaped to accept the stack of billets when dropped from said stamping means, the bottom side of the stack being carried by the bottom side electrode of said cavity, a top side electrode operatively engaged to a retractable plunger means intermittenly positionable over the open end of the cavity, said retractable plunger operatively engaged to a continuous movable top electrode conveyor belt, the position of said top side electrode indexed to the position of said cavity so said top side electrode applies pressure to the upper side of the stack of billets after said billets are dropped in the cavity, said mold body bottom side electrode and said top side electrode connectable to a radio frequency generator, said electrodes being positionable vertically opposite one another adjacent said dielectrically heatable billet.

* * * * *